US012021330B2

(12) United States Patent
Martin et al.

(10) Patent No.: US 12,021,330 B2
(45) Date of Patent: Jun. 25, 2024

(54) CONNECTOR WITH A MATING ASSISTANCE ASSEMBLY

(71) Applicant: TE Connectivity Services GmbH, Schaffhausen (CH)

(72) Inventors: Galen M. Martin, Middletown, PA (US); Barakissa Gakou, Middletown, PA (US)

(73) Assignee: TE Connectivity Solutions GmbH, Schaffhausen (CH)

( * ) Notice: Subject to any disclaimer, the term of this patent is extended or adjusted under 35 U.S.C. 154(b) by 552 days.

(21) Appl. No.: 17/173,244

(22) Filed: Feb. 11, 2021

(65) Prior Publication Data

US 2022/0255263 A1 Aug. 11, 2022

(51) Int. Cl.
*H01R 13/631* (2006.01)
*H01R 13/502* (2006.01)
*H01R 13/629* (2006.01)

(52) U.S. Cl.
CPC ......... *H01R 13/631* (2013.01); *H01R 13/502* (2013.01); *H01R 13/62922* (2013.01)

(58) Field of Classification Search
CPC ................ H01R 13/631; H01R 13/502; H01R 13/62922; H01R 13/62911; H01R 13/629; H01R 13/508; H01R 13/62905; H01R 13/62927
See application file for complete search history.

(56) References Cited

U.S. PATENT DOCUMENTS

| | | | | |
|---|---|---|---|---|
| 7,632,116 B2 * | 12/2009 | Lee | H01R 13/635 | 439/372 |
| 11,581,680 B2 * | 2/2023 | Martin | H01R 13/62922 | |
| 2002/0031927 A1 * | 3/2002 | Fukamachi | H01R 13/62905 | 439/157 |
| 2008/0194135 A1 * | 8/2008 | Lee | H01R 13/62911 | 439/370 |
| 2022/0255263 A1 * | 8/2022 | Martin | H01R 13/502 | |
| 2022/0255264 A1 * | 8/2022 | Martin | H01R 13/635 | |

* cited by examiner

*Primary Examiner* — Abdullah A Riyami
*Assistant Examiner* — Nader J Alhawamdeh

(57) ABSTRACT

A connector includes a housing receiving a mating connector in a mating direction, a slide movable with respect to the housing between a latched position and a released position, and a mating assistance assembly. The slide automatically moves from the latched position to the released position upon insertion of the mating connector to a partially mated position in the housing. The mating assistance assembly imparts a mating assistance force on the mating connector as the slide moves from the latched position to the released position. The mating assistance force moves the mating connector further into the housing along the mating direction from the partially mated position to a fully mated position.

19 Claims, 7 Drawing Sheets

CONNECTOR WITH A MATING ASSISTANCE ASSEMBLY

FIELD OF THE INVENTION

The present disclosure relates to an electrical connector and, more particularly, to a connector with a mating assistance assembly.

BACKGROUND

A male electrical connector is inserted into a female electrical connector to form an electrical connection between the connectors. In connectors used for certain applications, such as for electrical connection environments with high vibration or harsh conditions, the insertion force required for a user to insert the male electrical connector into the female electrical connector can be high. A high required insertion force is difficult for the user and increases the likelihood of damage to the connectors due to misapplied mating forces.

In some electrical connector assemblies, one of the connectors has a slide that is movable with respect to the connector to ease the application of the mating force. For example, a slide is attached to the female connector and, when the male connector is inserted partially into the female connector, the user pushes the slide down toward the female connector. The slide engages the male connector under the applied force of the user and pushes the male connector into the female connector. Although this arrangement simplifies the application of the force from the user, the user nonetheless is still generating all the force necessary to mate the connectors.

SUMMARY

A connector includes a housing receiving a mating connector in a mating direction, a slide movable with respect to the housing between a latched position and a released position, and a mating assistance assembly. The slide automatically moves from the latched position to the released position upon insertion of the mating connector to a partially mated position in the housing. The mating assistance assembly imparts a mating assistance force on the mating connector as the slide moves from the latched position to the released position. The mating assistance force moves the mating connector further into the housing along the mating direction from the partially mated position to a fully mated position.

BRIEF DESCRIPTION OF THE DRAWINGS

The invention will now be described by way of example with reference to the accompanying Figures, of which.

DETAILED DESCRIPTION OF THE EMBODIMENTS

Figure 1:
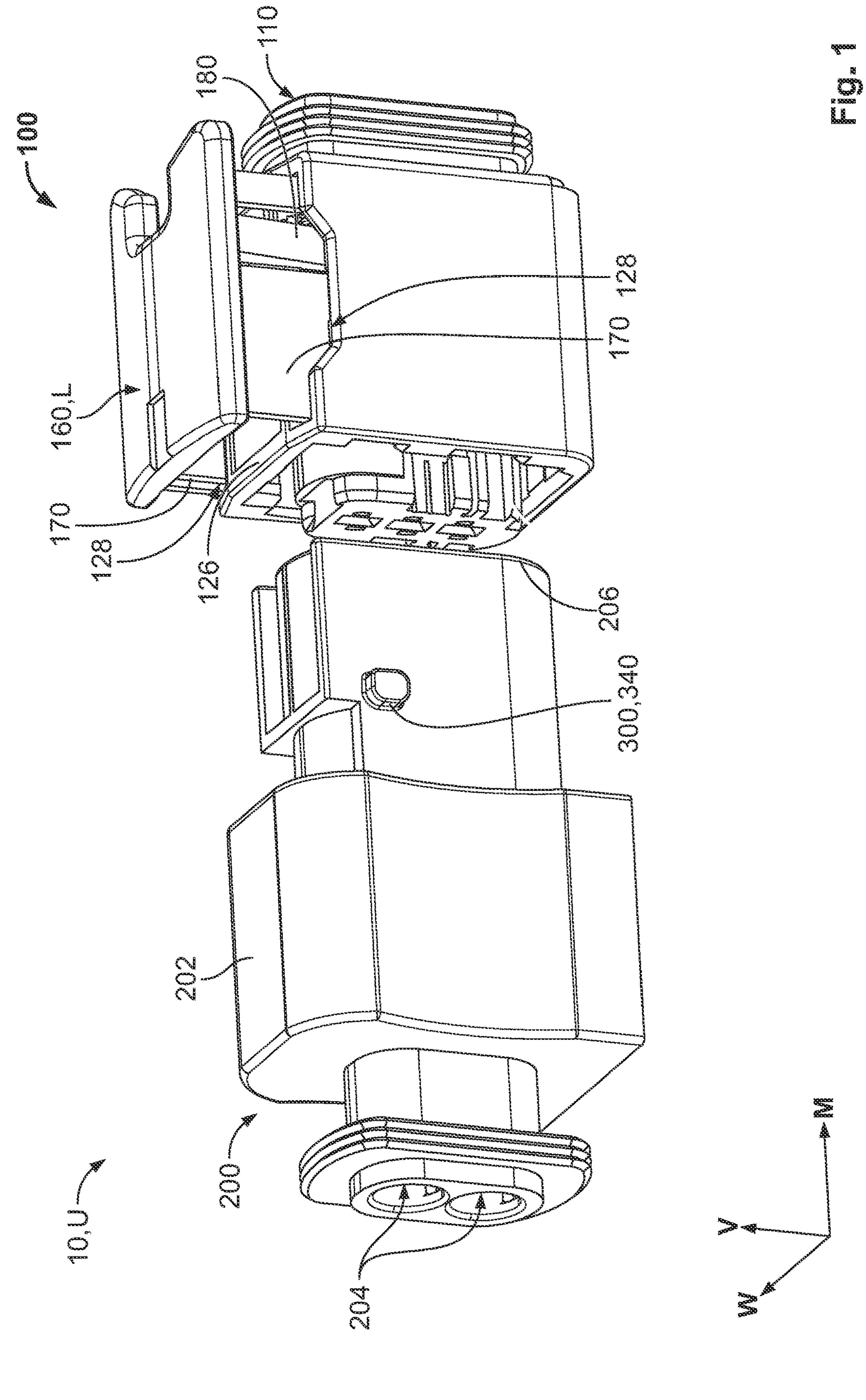
FIG. 1 is a perspective view of an electrical connector assembly according to an embodiment in an unmated position.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

An electrical connector assembly 10 according to an embodiment, as shown in FIG. 1, comprises a first connector 100 and a second connector 200 matable with the first connector 100. The electrical connector assembly 10 is shown in an unmated position U in FIG. 1 in which the second connector 200 is not mated with the first connector 100. Throughout the specification, the first connector 100 may also be referred to as a receiving connector and the second connector 200 may also be referred to as a mating connector.

Figure 2:
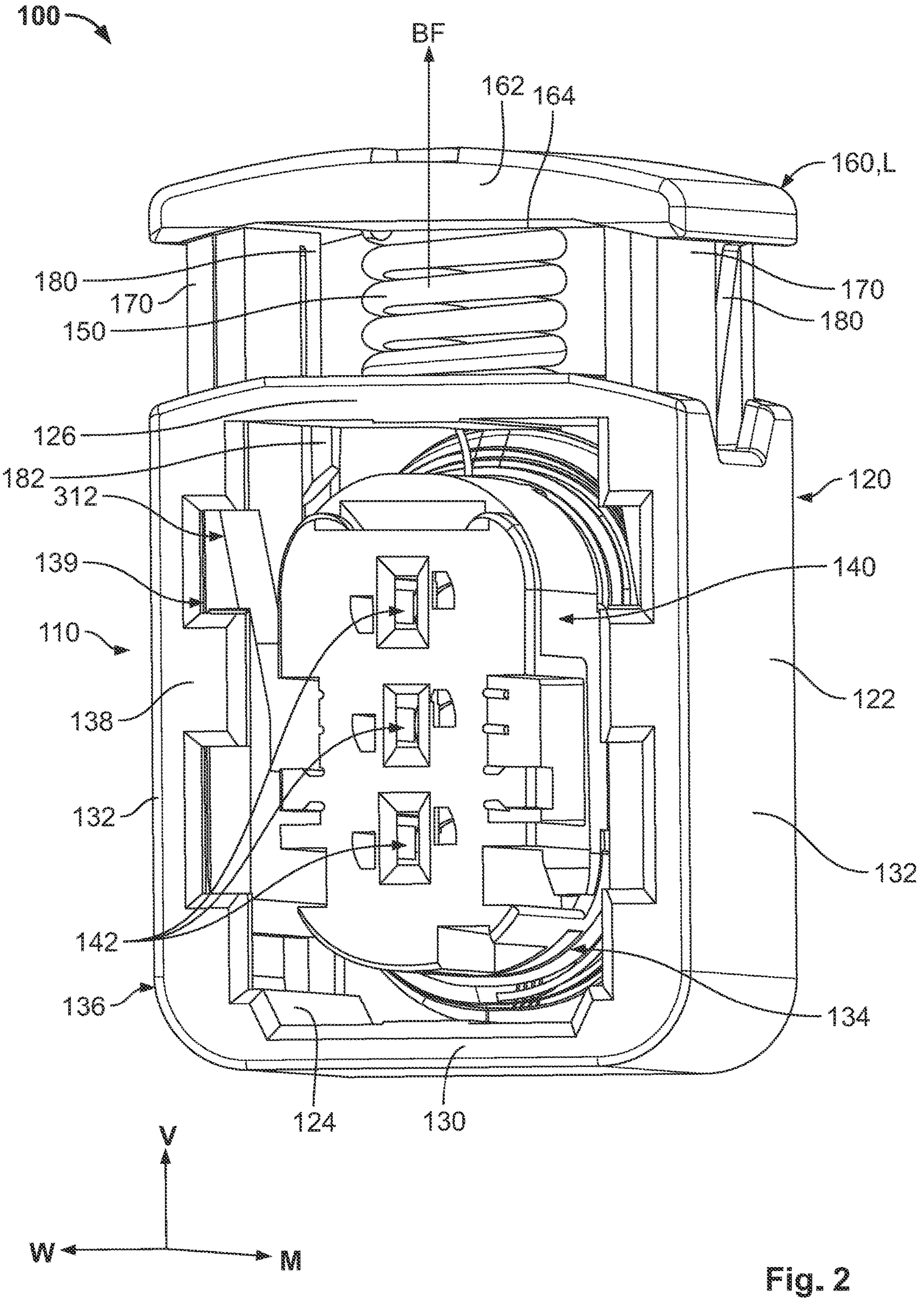
FIG. 2 is a perspective view of a first connector of the electrical connector assembly.
Figure 3:
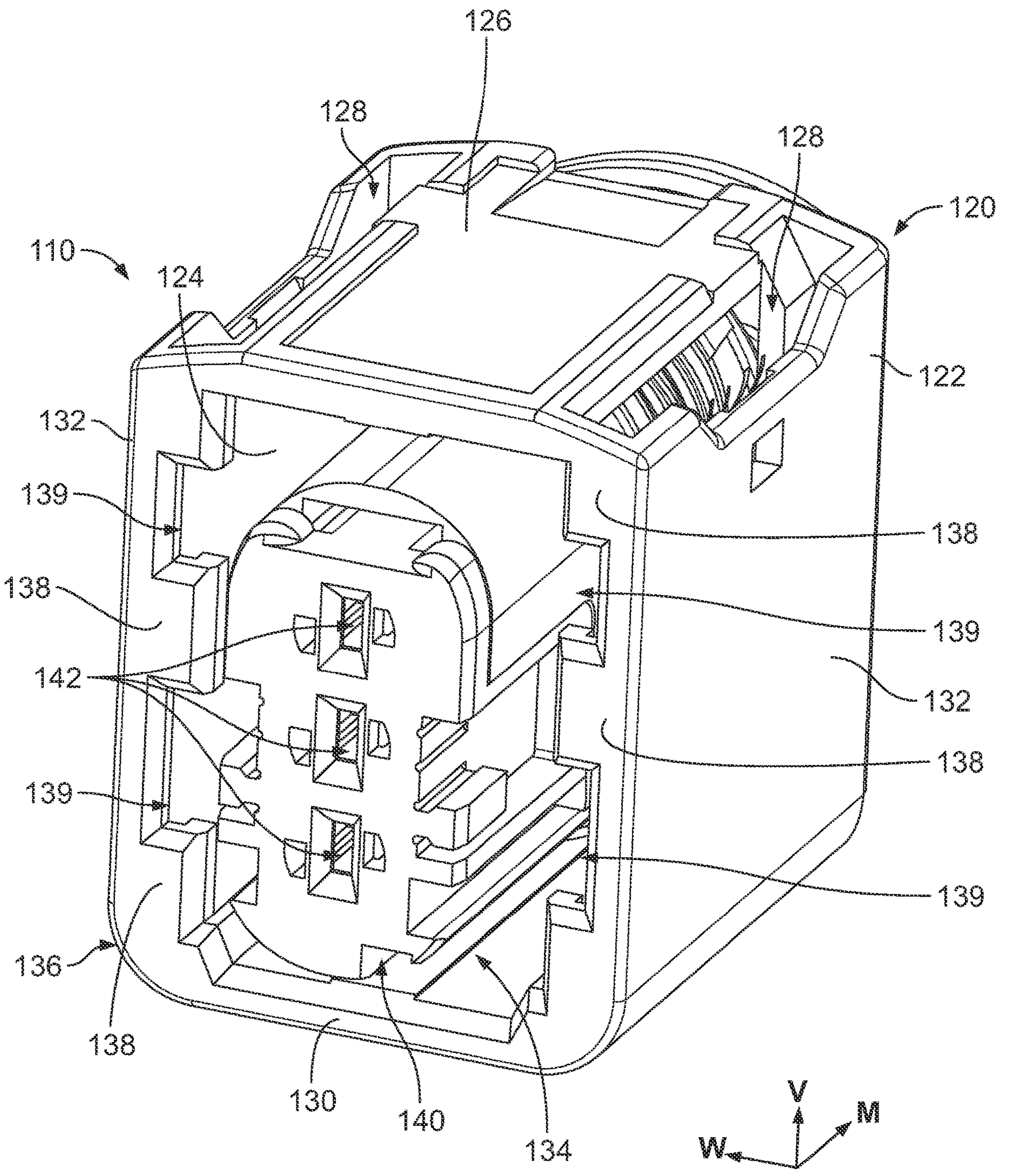
FIG. 3 is a perspective view of a housing of the first connector.

The first connector 100, as shown in FIGS. 1-3, includes a housing 110, an elastic element 150, and a slide 160. The housing 110 includes an outer housing 120 and an inner housing 140 disposed within the outer housing 120.

The outer housing 120, as shown in FIGS. 2 and 3, has an outer surface 122 and an inner surface 124 opposite the outer surface 122. The outer housing 120, in the shown embodiment, is formed of an upper wall 126, a lower wall 130 opposite the upper wall 126 in a vertical direction V, and a pair of side walls 132 connecting the upper wall 126 to the lower wall 130. The side walls 132 extend in the vertical direction V parallel to one another and are positioned opposite one another in a width direction W perpendicular to the vertical direction V. The outer surface 122 and the inner surface 124 are formed by and extend along each of the upper wall 126, the lower wall 130, and the side walls 132.

In the shown embodiment, the outer housing 120 has an approximately rectangular cuboid shape with the above-described walls 126, 130, 132. In other embodiments, the outer housing 120 could have any shape suitable for use as a housing of an electrical connector.

The outer housing 120 defines an interior receiving space 134, as shown in FIGS. 2 and 3. The interior receiving space 134 is open at least at a receiving end 136 of the outer housing 120 in a mating direction M in which the first connector 100 receives the second connector 200 during mating. The mating direction M is perpendicular to the vertical direction V and the width direction W.

As shown in FIGS. 2 and 3, the upper wall 126 has a pair of slots 128 extending through the upper wall 126 in the vertical direction V and communicating with the interior receiving space 134 of the outer housing 120. In the shown embodiment, the slots 128 are each positioned on the upper wall 126 adjacent to the inner surface 124 of one of the side walls 132. In other embodiments, only one slot 128 or more than two slots 128 may extend through the upper wall 126, and the slots 128 may be positioned elsewhere on upper wall 126 than in the shown embodiment, provided the slots 128 are capable of serving the function described below.

At the receiving end 136, as shown in FIG. 3, the outer housing 120 has a flange 138 extending in the width direction W from the inner surface 124 of each of the side walls 132 toward the opposite side wall 132. Each of the flanges 138 has at least one opening 139 at which the flange 138 extends a shorter distance in the width direction W from the side wall 132. In an embodiment, the flange 138 is absent at the opening 139 and the receiving end 136 is flush with the inner surface 124 of the side wall 132 along the mating direction M. In the shown embodiment, each of the flanges 138 has two openings 139 spaced apart from one another in the vertical direction V. In other embodiments, each of the flanges 138 may have one opening 139 or more than two openings 139. In another embodiment, the flanges 138 can be omitted from the outer housing 120.

The inner housing 140, as shown in FIGS. 2 and 3, is disposed in the interior receiving space 134 of the outer housing 120 and surrounded by the walls 126, 130, 132 of the outer housing 120. The inner housing 140 has a plurality of first terminal receiving passageways 142 each receiving a first terminal secured in the first terminal receiving passageway 142. In the shown embodiment, the inner housing 140 has an approximately oval shape and three first terminal receiving passageways 142 arranged linearly. In other embodiments, the inner housing 140 may have any other shape, such as a rectangular or circular shape, and may have any number of first terminal receiving passageways 142 in any arrangement appropriate for the electrical connection application of the first connector 100.

In the shown embodiment, the inner housing 140 is formed separately from the outer housing 120 and is attached to the outer housing 120 in the orientation shown in FIGS. 2 and 3. The inner housing 140 is formed of an insulative material in the shown embodiment. The outer housing 120 may be formed of either an insulative material or a conductive material in the shown embodiment. In another embodiment, the inner housing 140 and the outer housing 120 are monolithically formed in a single piece in the orientation shown in FIGS. 2 and 3; in this embodiment, both the inner housing 140 and the outer housing 120 are formed of an insulative material.

The elastic element 150, shown in FIG. 2, is a coil spring in the shown embodiment. In other embodiments, the elastic element 150 can be any type of elastically compressible member that imparts an increasing outward force with increased compression. The elastic element 150 is obscured but present in the first connector 100 in FIGS. 1 and 5-8.

Figure 4:
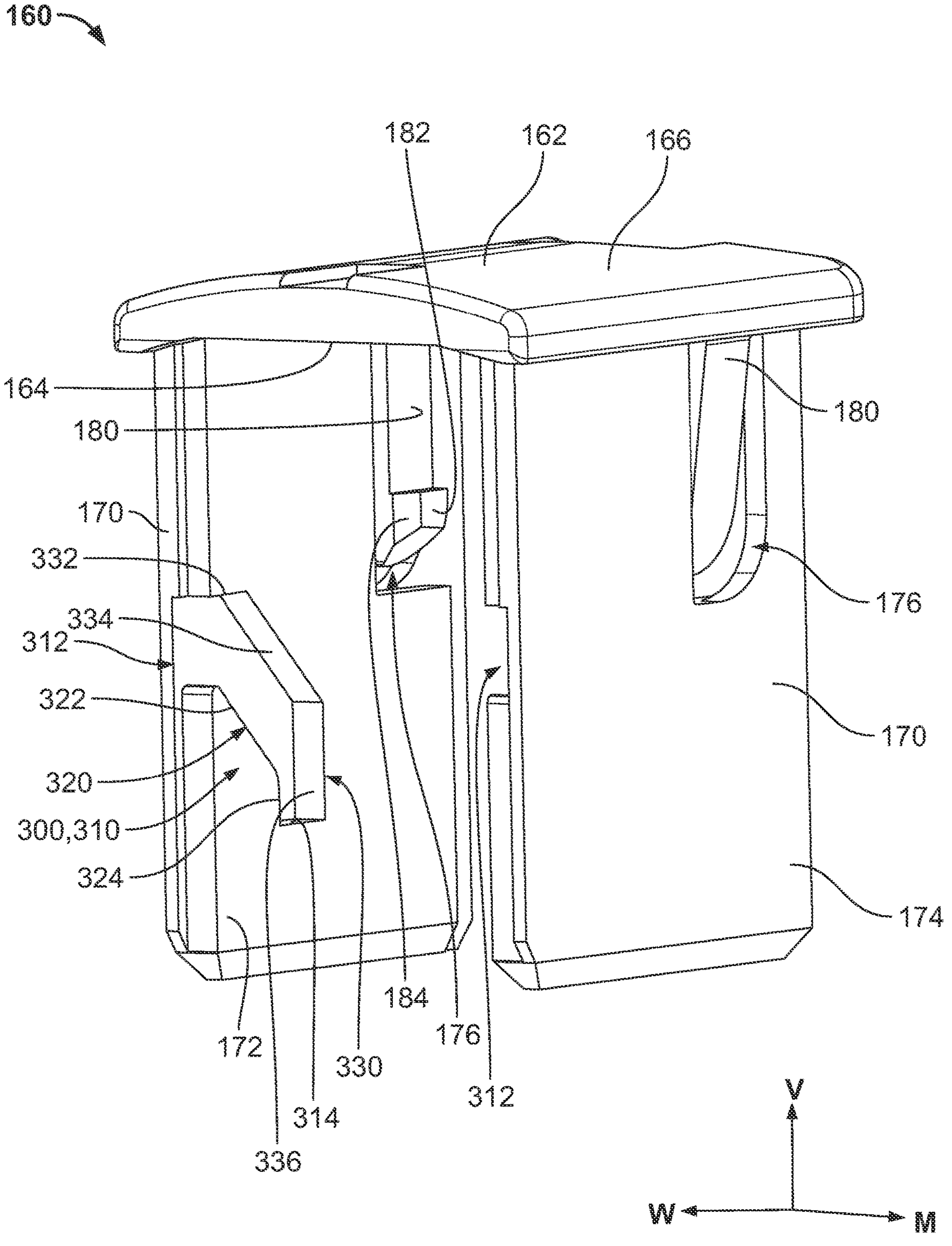
FIG. 4 is a perspective view of a slide of the first connector.

The slide 160, as shown in FIGS. 2 and 4, has a base 162, a pair of legs 170 extending from the base 162, and a pair of latch arms 180 extending from the base 162. The base 162 has an inner base surface 164 and an outer base surface 166 opposite the inner base surface 164.

The pair of legs 170, as shown in FIG. 4, extend from the inner base surface 164 along the vertical direction V parallel to one another. The legs 170 are positioned opposite one another along the width direction W and are mirror symmetrical to one another along the width direction W. The legs 170 each have an inner leg surface 172 and an outer leg surface 174 opposite the inner leg surface 172. Each of the legs 170 has a window 176 extending through the leg 170 from the outer leg surface 174 to the inner leg surface 172 in the width direction W and extending from a position adjacent to the base 162 and away from the base 162 along the vertical direction V.

The latch arms 180 are mirror symmetrical with respect to each other along the width direction W and, as shown in FIG. 4, are each positioned in the window 176 of one of the legs 170. Each of the latch arms 180 is cantilevered from the base 162 and is resiliently deflectable with respect to the base 162 and the legs 170 within the window 176. Each of the latch arms 180 has a latch protrusion 182 at an end opposite the base 162. Only one of the latch protrusions 182 is visible in FIG. 4, but both latch arms 180 have mirror symmetrical latch protrusions 182, and the description of the latch protrusion 182 applies to both latch arms 180. The latch protrusion 182 extends from the latch arm 180 toward the opposite leg 170. The latch protrusion 182 has an angled side 184; the angled side 184 is a chamfer extending at an angle.

In the shown embodiment, the slide 160 is monolithically formed in a single piece from an insulative or a conductive material. In other embodiments, the slide 160 can be formed in a number of pieces, of an insulative or a conductive material or a mix thereof, and assembled together to form the slide 160 as shown in FIG. 4.

The second connector 200, as shown in FIG. 1, has an outer surface 202 and a mating end 206 at an end of the second connector 200 in the mating direction M. The second connector 200 has a plurality of second terminal receiving passageways 204 extending through the second connector 200. Each of the second terminal receiving passageways 204 receives a second terminal secured in the second terminal receiving passageway 204. In the shown embodiment, the second connector 202 has an approximately oval shape and the second terminal receiving passageways 204 are arranged linearly. In other embodiments, the second connector 200 may have any other shape, such as a rectangular or circular shape, and may have any number of second terminal receiving passageways 204 in any arrangement appropriate for the electrical connection application of the second connector 200 with the first connector 100.

In the shown embodiment, the second connector 200 is designed to be attached to an end of a cable with conductors of the cable electrically connected to the second terminals. In other embodiments, the second connector 200 could be any form of electrical connector suitable in a variety of applications, such as a header directly connected to a printed circuit board.

Figure 5:
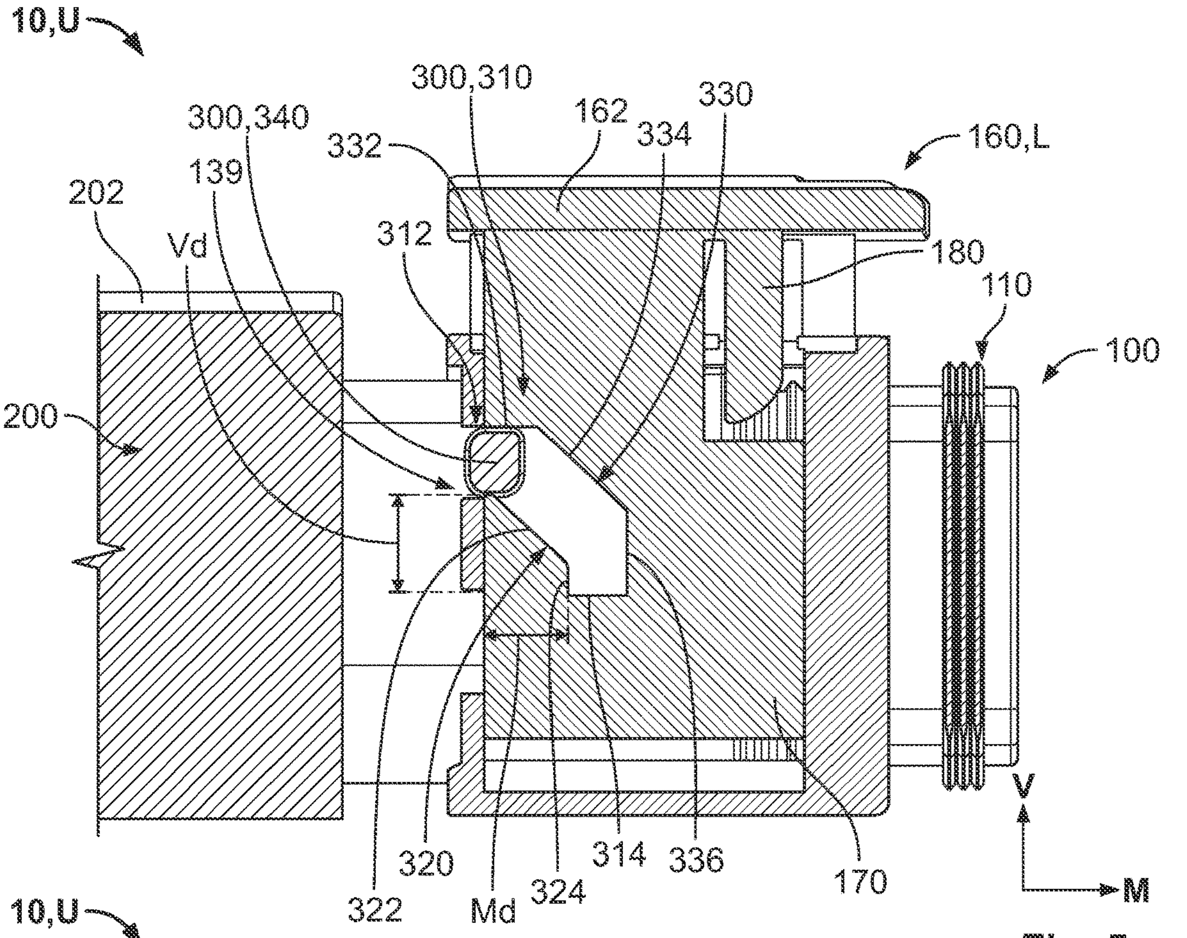
FIG. 5 is a sectional side view of the electrical connector assembly in the unmated position.
Figure 7:
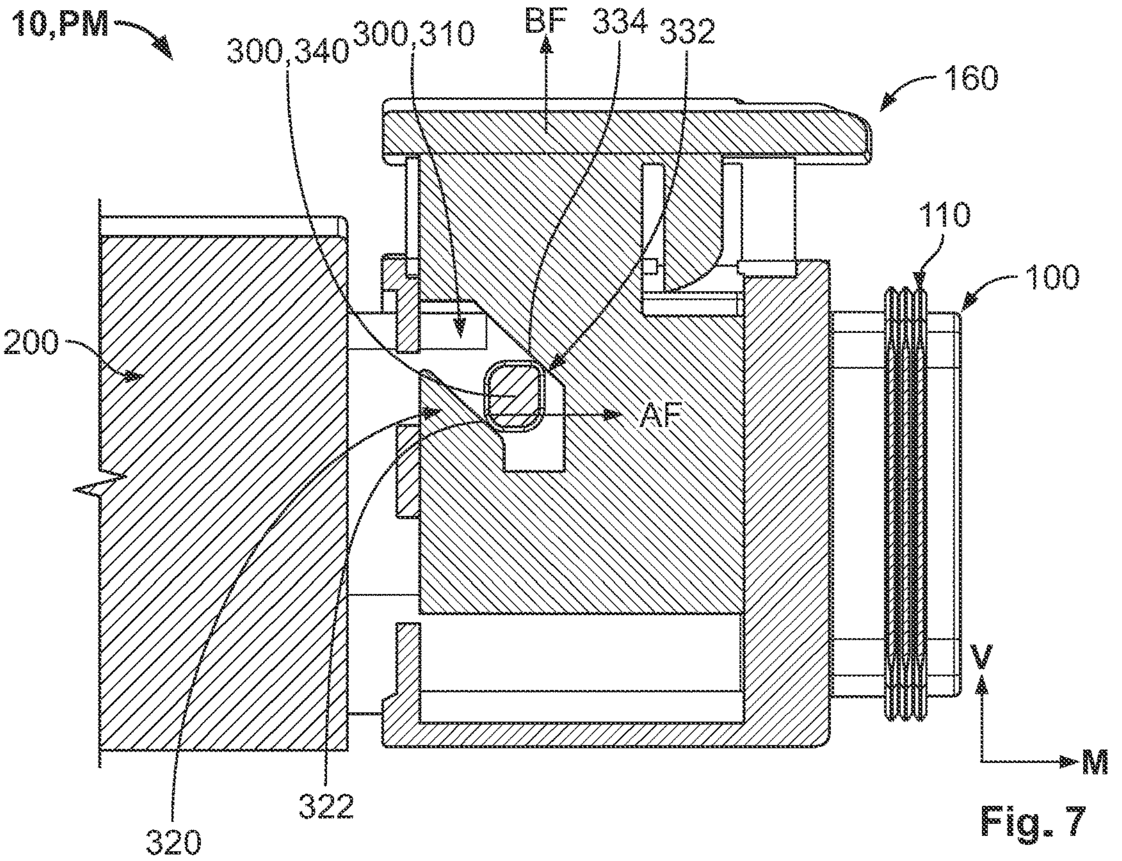
FIG. 7 is a sectional side view of the electrical connector assembly in a partially mated position.
Figure 8:
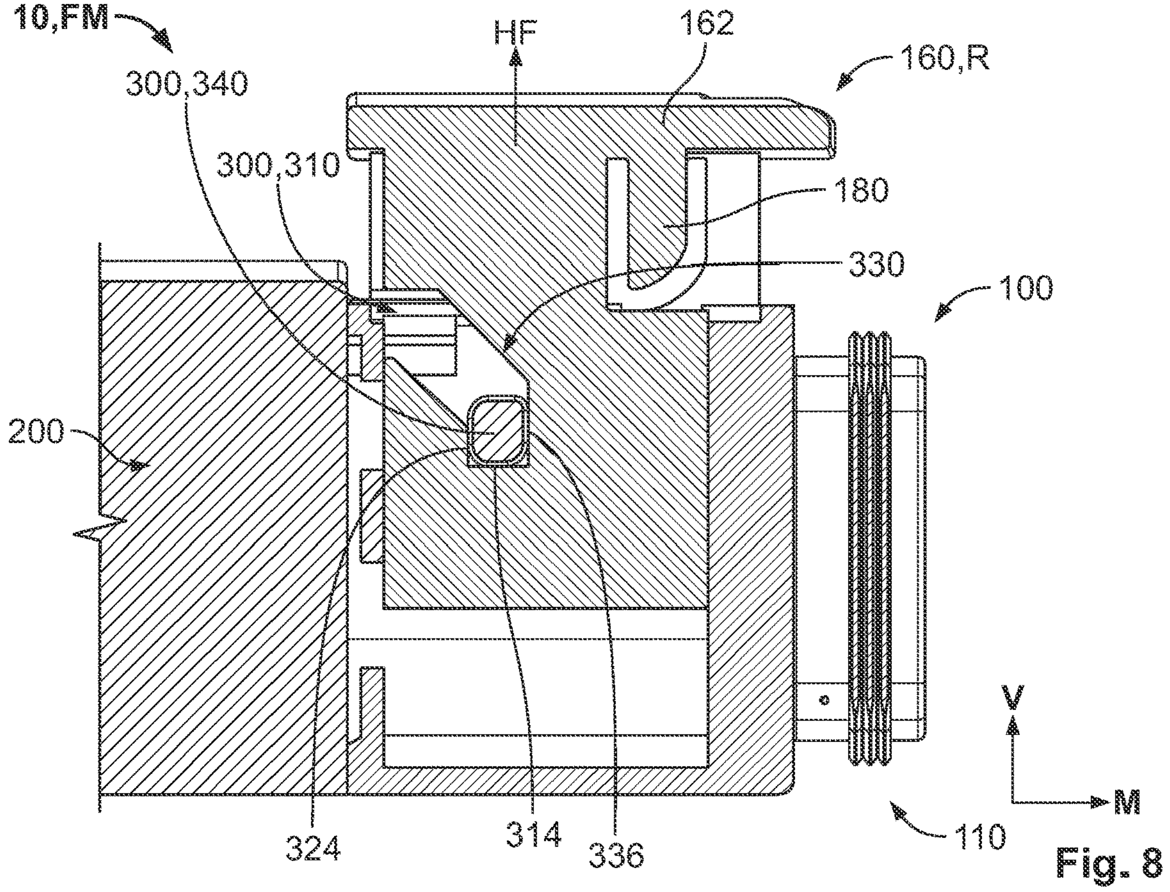
FIG. 8 is a sectional side view of the electrical connector assembly in a fully mated position.

The electrical connector assembly 10, as shown in FIGS. 5, 7, and 8, includes a mating assistance assembly 300 disposed on the first connector 100 and the second connector 200. The mating assistance assembly 300 includes a pair of guide slots 310 and a pair of guide elements 340 movable along the guide slots 310.

In the following description, the guide slots 310 will be shown and described as parts of the slide 160 of the first connector 100 and the guide elements 340 will be shown and described as parts of the second connector 200. In other embodiments, the guide slots 310 could be on either the slide 160 or the mating connector 200 and the guide elements 340 could be on the other of the slide 160 and the mating connector 200; for example, the guide slots 310 could be part of the mating connector 200 and the guide elements 340 could be part of the slide 160. Other arrangements of the guide slots 310 and guide elements 340 than the arrangement shown and described below nonetheless have a similar structure and the same function as described below. Although the mating assistance assembly 300 will be described as a pair of guide slots 310 interacting with a pair of guide elements 340, in another embodiment, the mating assistance assembly 300 may only have one guide slot 310 and one guide element 340 interacting as described herein, or may have more than two guide slots 310 and a more than two guide elements 340.

As shown in FIGS. 4 and 5, each of the guide slots 310 is disposed on one of the legs 170. The guide slot 310 extends from a guide opening 312 at a side of the leg 170 in the mating direction M to a stop wall 314 at an end of the guide slot 310 opposite the guide opening 312. The stop wall 314 is displaced from the guide opening 312 by a mating direction displacement Md in the mating direction M and by a vertical direction displacement Vd in the vertical direction V. The guide opening 312 is open along the mating direction M and the stop wall 314 extends in the mating direction M. Only one of the guide slots 310 is fully visible in FIGS. 4 and 5, but the guide slots 310 are disposed mirror symmetrically on the legs 170, and the description of the guide slots 310 herein applies to both legs 170.

Each of the guide slots 310, as shown in FIGS. 4 and 5, has a first cam surface 320 defining a side of the guide slot 310 and extending from the guide opening 312 to the stop wall 314, and a second cam surface 330 defining a side of the guide slot 310 opposite the first cam surface 320 and extending from the guide opening 312 to the stop wall 314.

The first cam surface 320, as shown in FIGS. 4 and 5, has a first angled portion 322 extending from the guide opening 312 at an angle to the mating direction M and the vertical direction V. The first cam surface 320 has a first vertical portion 324 extending in the vertical direction V from the first angled portion 322 to the stop wall 314.

The second cam surface 330, as shown in FIGS. 4 and 5, has a horizontal portion 332 extending from the guide opening 312 along the mating direction M, a second angled portion 334 extending from the horizontal portion 332 at an angle with respect to the mating direction M and the vertical direction V, and a second vertical portion 336 extending from the second angled portion 334 to the stop wall 314 in the vertical direction V. In the shown embodiment, the second angled portion 334 is parallel to the first angled portion 322 and the second vertical portion 336 is parallel to the first vertical portion 324.

As shown in the embodiment of FIG. 4, each of the guide slots 310 can extend partially into the leg 170 from the inner leg surface 172 toward the outer leg surface 174 in the width direction W. In another embodiment, each of the guide slots 310 could extend fully through the leg 170 in the width direction W from the inner leg surface 172 through to the outer leg surface 174.

As shown in the embodiment of FIGS. 1 and 5, the guide elements 340 extend from the outer surface 202 of the second connector 200 adjacent to the mating end 206. The guide elements 340 are disposed mirror symmetrically on opposite sides of the outer surface 202 in the width direction W. In the shown embodiment, the guide elements 340 are each an approximately cylindrical post extending from the outer surface 202 in the width direction W. In other embodiments, each of the guide elements 340 could be any other shape or type of protrusion extending from the outer surface 202, provided it can move within one of the guide slots 310 as described below.

The assembly of the first connector 100 will now be described in greater detail primarily with reference to FIGS. 2, 5, and 6.

The slide 160 is shown in a latched position L on the housing 110 in FIGS. 1, 2, 5, and 6. To reach the latched position L, each of the legs 170 is inserted into one of the slots 128 of the upper wall 126 and the slide 160 is moved toward the housing 110 along the vertical direction V. As the legs 170 are inserted into the slots 128, the latch protrusion 182 on each latch arm 180 contacts the upper wall 126 and the latch arms 180 deflect away from the upper wall 126. When the slide 160 reaches the latched position L, the latch protrusions 182 have passed the upper wall 126 in the vertical direction V and the latch arms 180 elastically return to a position in which the latch protrusions 182 are positioned in the interior receiving space 134 and engage the inner surface 124 of the upper wall 126. The engagement of the latch protrusions 182 with the upper wall 126 secures the slide 160 in the latched position L on the housing 110.

Figure 6:
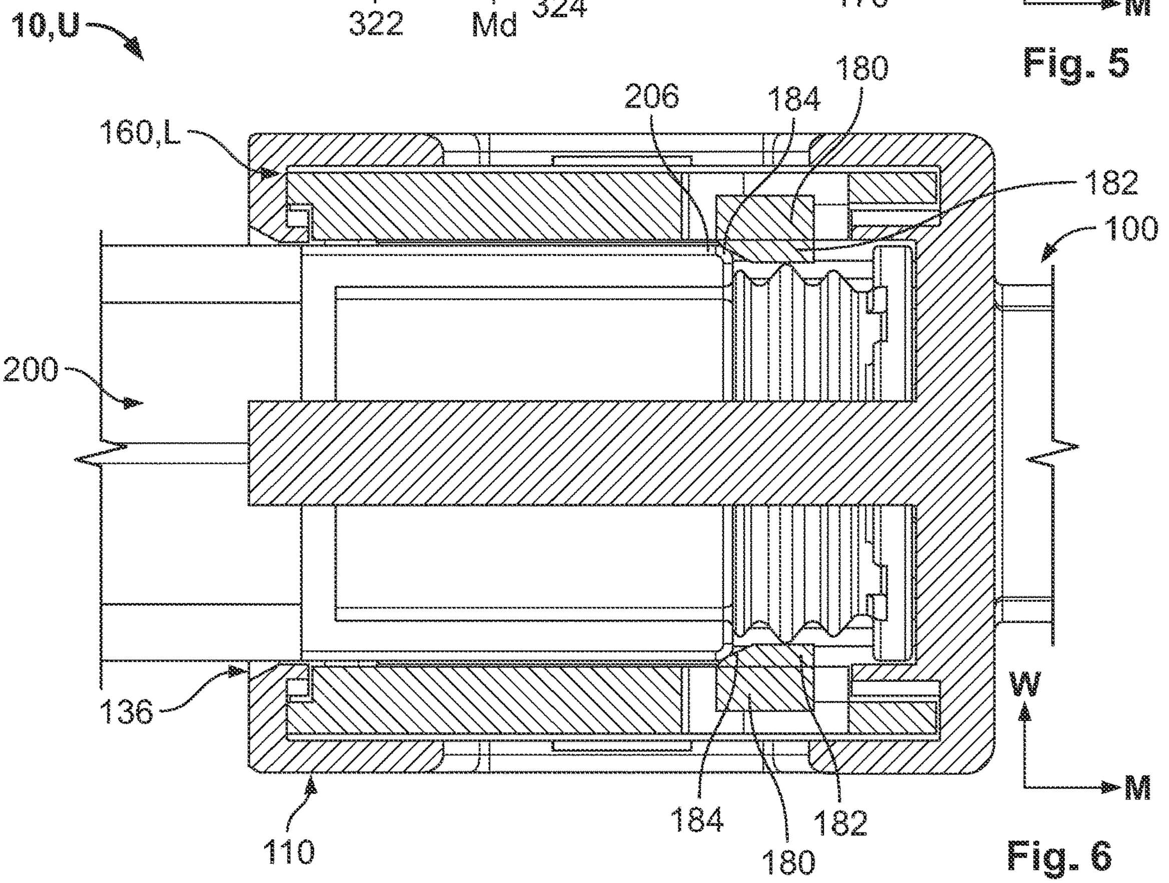
FIG. 6 is a sectional top view of the electrical connector assembly in the unmated position.

In the latched position L, as shown in FIGS. 2 and 6, the angled side 184 of each of the latch arms 180 faces the receiving end 136 of the housing 110 in the mating direction M. In the latched position L, in the shown embodiment, the guide opening 312 is aligned with one of the openings 139 in the flange 138 along the mating direction M.

The elastic element 150, as shown in FIG. 2, is disposed between the housing 110 and the slide 160 in the vertical direction V. The elastic element 150 abuts the outer surface 122 of the upper wall 126 and the inner base surface 164 of the base 162. In the latched position L, the elastic element 150 is compressed between the housing 110 and the slide 160 and, while the latch protrusions 182 secure the slide 160 in the latched position L on the housing 110, the elastic element 150 provides a biasing force BF biasing the slide 160 away from the housing 110 in the vertical direction V. The biasing force BF biases the slide 160 or is directed toward a released position R of the slide 160 described in greater detail below.

The mating of the first connector 100 with the second connector 200 and the use of mating assistance assembly 300 to provide a mating assistance force AF assisting the mating of the electrical connector assembly 10 will now be described in greater detail below primarily with reference to FIGS. 1 and 5-9.

Starting from the unmated position U of the electrical connector assembly 10 shown in FIG. 1, with the first connector 100 assembled as shown in FIGS. 1, 2, and 5 having the slide 160 in the latched position L and the elastic element 150 providing the biasing force BF, the second connector 200 is inserted into the first connector 100 along the mating direction M.

As shown in FIG. 6, the mating end 206 of the second connector 200 is inserted into the receiving end 136 of the housing 110 along the mating direction M until the mating end 206 contacts the angled side 184 of each of the latch protrusions 182. In this position, as shown in FIG. 5, each of the guide elements 340 has entered the guide opening 312 of one of the guide slots 310. The slide 160 remains in the latched position L in the position shown in FIGS. 5 and 6.

As the second connector 200 is further inserted along the mating direction M to a partially mated position PM shown in FIG. 7, the mating end 206 pushes and moves along the angled side 184 of each of the latch protrusions 182, deflecting the latch arms 180 apart from one another in the width direction W. The deflection of the latch arms 180 moves the latch protrusions 182 out of engagement with the inner surface 124 of the upper wall 126, disengaging the latch arms 180 from the housing 110. Once the latch protrusions 182 no longer engage the upper wall 126, as shown in FIG. 7, the biasing force BF of the elastic element 150 moves the slide 160 away from the housing 110 in the vertical direction V.

As the slide 160 moves away from the housing 110 in the vertical direction V, the mating assistance assembly 300 provides a mating assistance force AF moving the second connector 200 further into the first connector 100 along the mating direction M, as shown in FIGS. 7 and 8. The following description focuses on the interaction of one guide element 340 with one guide slot 310 but applies equally to each of the guide elements 340 in each guide slot 310 according to various embodiments.

The movement of the slide 160 forces the first cam surface 320 into abutment with the guide element 340, as shown in FIG. 7. The first angled portion 322 abuts the guide element 340 and transfers the biasing force BF acting on the slide 160 in the vertical direction V into a mating assistance force AF acting on the guide element 340. The second connector 200 is held in the interior receiving space 134 in the vertical direction V and cannot move in the vertical direction V with respect to the first connector 100. Consequently, the mating assistance force AF from the first angled portion 322 is a force vector acting on the guide element 340 in the mating direction M. As the slide 160 moves away from the housing 110 in the vertical direction V under the biasing force BF of the elastic element 150, the guide element 340 is urged along the first angled portion 322 and is moved further into the first connector 100 under the mating assistance force AF.

Figure 9:
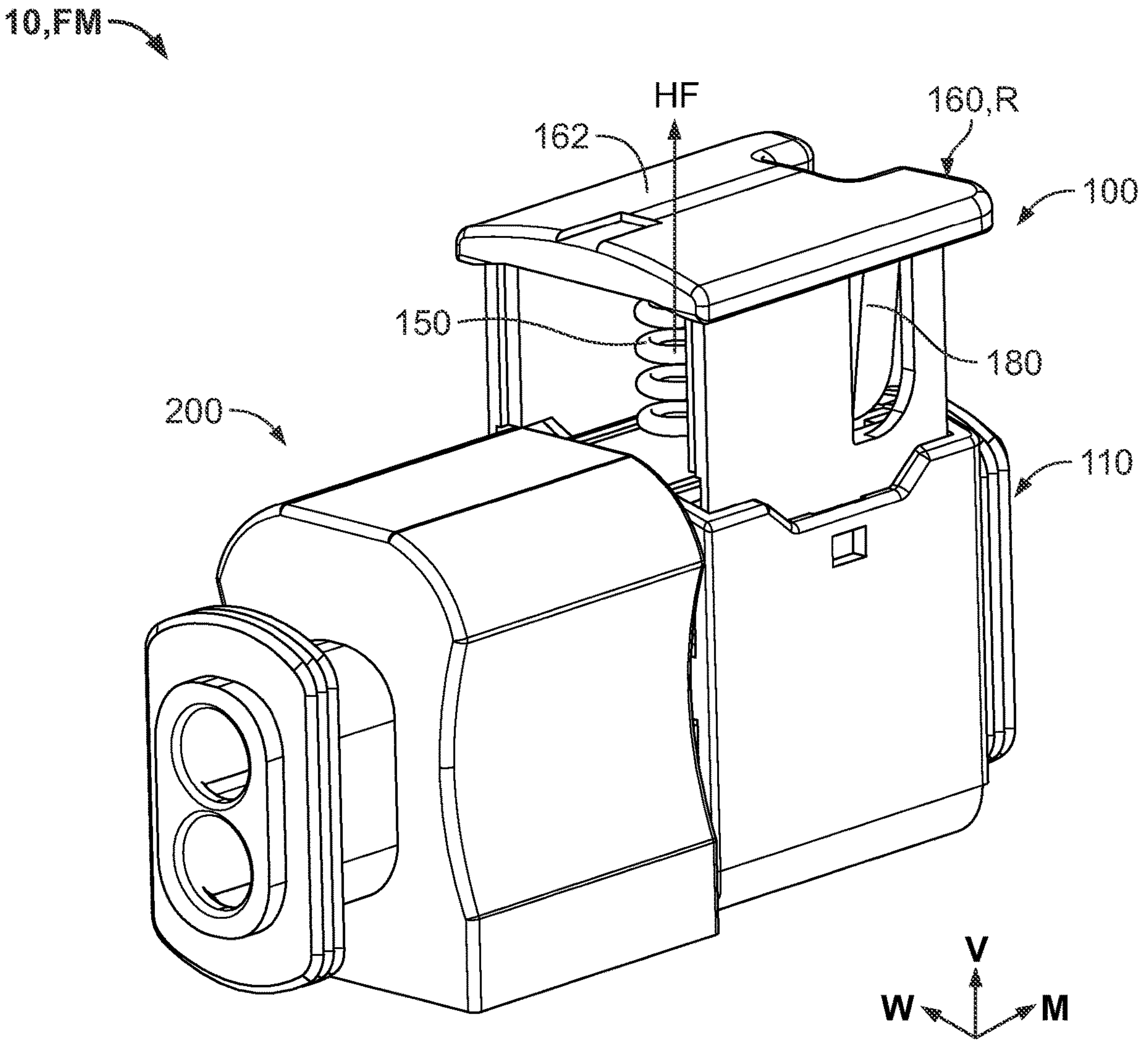
FIG. 9 is a perspective view of the electrical connector assembly in the fully mated position.

The guide element 340 continues to move along the first angled portion 322, moving the second connector 200 into the first connector 100 along the mating direction M, until the second connector 200 reaches a fully mated position FM in the first connector 100, as shown in FIGS. 8 and 9. In the fully mated position FM, the slide 160 is in a released position R in which the base 162 is positioned furthest from the housing 110 in the vertical direction V. The guide element 340 abuts the first vertical portion 324 and the stop wall 314 in the released position R, preventing the second connector 200 from moving with respect to the first connector 100 in the mating direction M in the fully mated position FM.

In the released position R, as shown in FIGS. 8 and 9, the elastic element 150 provides a holding force HF continuing to urge the slide 160 away from the housing 110 in the vertical direction V. The abutment of the guide element 340 with the stop wall 314 prevents the slide 160 from moving further away from the housing 110 and the holding force HF helps to secure the guide element 340 against the stop wall 314 between the first vertical portion 324 and the second vertical portion 336. The elastic element 150 is less compressed in the released position R than in the latched position L and, consequently, the holding force HF is less than the biasing force BF.

In order to unmate the electrical connector assembly 10 from the fully mated position FM, the slide 160 is pressed back toward the housing 110 from the released position R shown in FIGS. 8 and 9. A user pushes the base 162 toward the housing 110 in the vertical direction V against the holding force HF of the elastic element 150, moving the guide element 340 out of abutment with the stop wall 314, along the second vertical portion 336, and into abutment with the second angled portion 334 of the second cam surface 330 as shown in FIG. 7.

As the user continues to press the base 162 toward the housing 110 in the vertical direction V, the guide element 340 moves along the second angled portion 334 similarly to but opposite to the movement described with respect to the first angled portion 322 above; the second angled portion 334 transfers the force of the user on the base 162 in the vertical direction V into a force vector acting on the guide element 340 to move the second connector 200 out of the first connector 100 and away from the housing 110 in the mating direction M.

The user continues to press against the force of the elastic element 150 and the guide element 340 continues to move along the second angled portion 334 until the slide 160 reaches the locked position L shown in FIG. 5; the user presses on the base 162 in the vertical direction V until the latch arms 180 deflect and return around the upper wall 126, returning the latch protrusions 182 into engagement with the inner surface 124 of the upper wall 126 as described above. In this position, the guide element 340 abuts the horizontal portion 332, as shown in FIG. 5, and the electrical connector assembly 10 is in the unmated position U shown in FIG. 1. The second connector 200 can be then be fully removed from the first connector 100 by pulling apart along the mating direction M.

In various embodiments, the electrical connector assembly 10 is usable in a variety of electrical connector applications, including with sealed or unsealed connectors, with any number of terminals, and with a range of mountings of the connectors as described above. The electrical connector assembly 10 as described above is generally applicable to the mating of any two matable connectors provided the mating assistance assembly 300 is capable of being incorporated into the electrical connector assembly 10 in some arrangement that would accomplish the above-described function.

In the electrical connector assembly 10 according to the present invention, the slide 160 automatically moves from the latched position L to the released position R under the biasing force BF of the elastic element 150 upon insertion of the second connector 200 to the partially mated position PM in the first connector 100. The mating assistance assembly 300 imparts the mating assistance force AF as the slide 160 moves from the latched position L to the released position R, moving the second connector 200 further into the first connector 100 along the mating direction M to the fully mated position FM. The automatically provided mating assistance force AF improves the ease of mating the second connector 200 with the first connector 100 by lessening the insertion force required from the user to bring the electrical connector assembly 10 into the fully mated position FM, easing usability and decreasing the likelihood of damage due to misapplied force during mating.

What is claimed is:

1. A connector, comprising:

a housing receiving a mating connector in a mating direction;

a slide movable with respect to the housing between a latched position and a released position, the slide automatically moves from the latched position to the released position upon insertion of the mating connector to a partially mated position in the housing; and a mating assistance assembly imparting a mating assistance force on the mating connector as the slide moves from the latched position to the released position, the mating assistance force moving the mating connector further into the housing along the mating direction from the partially mated position to a fully mated position, the mating assistance assembly includes:

a guide slot disposed on one of the slide and the mating connector; and a guide element disposed on the other one of the slide and the mating connector, the guide element moves along the guide slot between the latched position and the released position, the guide slot declining in a direction opposite to a direction of a biasing force along the mating direction such that the guide slot urges the mating connector toward the fully mated position under the biasing force.

2. The connector of claim 1, further comprising an elastic element providing the biasing force in the latched position biasing the slide toward the released position and away from the housing as the mating connector moves further into the housing.

3. The connector of claim 1, wherein the mating assistance assembly prevents the mating connector from moving in the mating direction in the released position of the slide.

4. The connector of claim 1, wherein the slide moves between the latched position and the released position in a direction perpendicular to the mating direction.

5. The connector of claim 1, wherein the slide moves away from the housing from the latched position toward the released position.

6. A connector assembly, comprising:

a first connector including a housing and a slide movable with respect to the housing between a latched position and a released position, the slide having a base and a latch arm extending from the base, the latch arm is resiliently deflectable with respect to the base and engages the housing in the latched position;

a second connector mateable with the first connector along a mating direction, the slide automatically moves from the latched position to the released position upon insertion of the second connector to a partially mated position in the housing; and a mating assistance assembly imparting a mating assistance force on the second connector as the slide moves from the latched position to the released position, the mating assistance force moving the second connector further into the housing along the mating direction from the partially mated position to a fully mated position.

7. The connector assembly of claim 6, further comprising an elastic element disposed between the housing and the base of the slide, the elastic element providing a biasing force in the latched position biasing the slide toward the released position.

8. The connector assembly of claim 6, wherein the latch arm has a latch protrusion on an end opposite the base, the latch protrusion has an angled side facing a receiving end of the housing in the mating direction.

9. The connector assembly of claim 8, wherein a mating end of the second connector abuts the angled side and disengages the latch arm from the housing when the second connector is inserted into the housing to the partially mated position.

10. The connector assembly of claim 6, wherein the mating assistance assembly includes a guide slot disposed on one of the slide and the second connector and a guide element disposed on the other of the slide and the second connector.

11. The connector assembly of claim 10, wherein the guide slot extends from a guide opening to a stop wall at an end opposite the guide opening, the stop wall is displaced from the guide opening in the mating direction and in a vertical direction perpendicular to the mating direction.

12. The connector assembly of claim 11, wherein the guide slot has a first cam surface defining a side of the guide slot and extending from the guide opening to the stop wall, the first cam surface has a first angled portion extending from the guide opening at an angle to the mating direction and the vertical direction.

13. The connector assembly of claim 12, wherein the mating assistance force is imparted between the guide element and the first angled portion as the slide moves from the latched position to the released position.

14. The connector assembly of claim 13, wherein the first cam surface has a first vertical portion extending from the first angled portion to the stop wall, the first vertical portion and the stop wall abut the guide element in the released position and prevent the second connector from moving in the mating direction in the fully mated position.

15. The connector assembly of claim 11, wherein the guide slot has a second cam surface defining a side of the guide slot opposite the first cam surface and extending from the guide opening to the stop wall, the second cam surface has a second angled portion extending at an angle to the mating direction and the vertical direction.

16. The connector assembly of claim 15, wherein, as the slide moves from the released position to the latched position, the second angled portion abuts the guide element to move the second connector out of the fully mated position and away from the housing in the mating direction.

17. The connector assembly of claim 6, wherein the slide has a leg extending from the base, the mating assistance assembly includes a guide slot in the leg.

18. The connector assembly of claim 17, wherein the mating assistance assembly includes a guide element extending from an outer surface of the second connector, the guide element moves along the guide slot between the latched position and the released position.

19. A connector, comprising:

a housing receiving a mating connector in a mating direction;

a slide movable with respect to the housing between a latched position and a released position;

an elastic element biasing the slide to move from the latched position to the released position upon insertion of the mating connector to a partially mated position in the housing; and a mating assistance assembly imparting a mating assistance force generated by the elastic element on the mating connector as the slide moves from the latched position to the released position, the mating assistance force biasing the slide in a direction perpendicular to the mating direction and moving the mating connector further into the housing along the mating direction from the partially mated position to a fully mated position, the mating assistance assembly includes:

a guide slot disposed on one of the slide and the mating connector; and a guide element disposed on the other one of the slide and the mating connector, the guide element moves along the guide slot between the latched position and the released position, the guide slot declining in a direction opposite to a direction of a biasing force applied by the elastic element along the mating direction such that the guide slot urges the mating connector toward the fully mated position under the biasing force.

* * * * *